United States Patent Office
3,195,909
Patented July 20, 1965

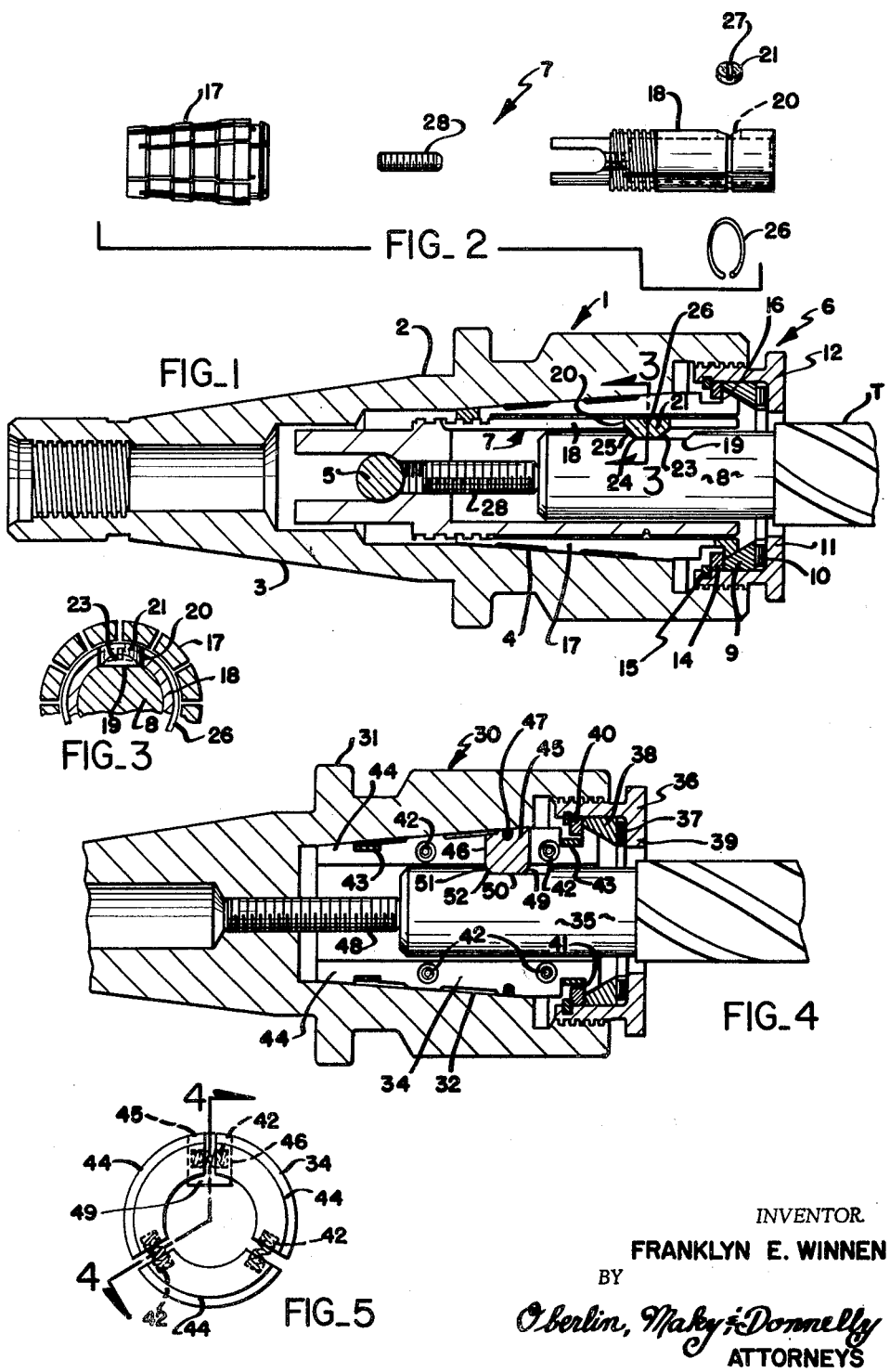

3,195,909
COLLET CHUCK AND THE LIKE
Franklyn E. Winnen, Cleveland, Ohio, assignor to Erickson Tool Company, Solon, Ohio, a corporation of Ohio
Filed June 6, 1963, Ser. No. 286,071
12 Claims. (Cl. 279—51)

The present invention relates generally as indicated to a collet chuck and more particularly to a collet chuck having means for locking an end mill or like tool against turning and axial withdrawal with respect to the collet. An end mill, for example, generally has helical flutes thereon which tend to "hog" into a workpiece at a rate exceeding the feed of the spindle on which the chuck is mounted, and thus severe tensile stresses are imposed on the tool causing it to be axially pulled out of and turned in the collet.

Accordingly, it is a primary object of this invention to provide the chuck collet herein with tool locking means that cooperates with a flat on the tool shank to prevent turning and axial withdrawing movement of the tool in the collet.

It is another object of this invention to provide an axially adjustable positive drive collet arrangement to enable axial presetting of the cutting tool in the chuck.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 1 is a central longitudinal cross-section view of one form of collet chuck embodying the present invention;

FIG. 2 is an exploded view of the positive drive axially adjustable collet arrangement of FIG. 1;

FIG. 3 is a transverse cross-section view taken along line 3—3, FIG. 1;

FIG. 4 is a longitudinal cross-section view taken substantially along the line 4—4, FIG. 5 of another embodiment of the invention employing a segmental collet; and FIG. 5 is an end elevation view of the collet of FIG. 4.

Referring now more particularly to the drawing, and first to FIGS. 1 to 3, the chuck 1 herein shown comprises a body 2 having a tapered shank 3 adapted to interfit the correspondingly tapered mouth of a machine tool spindle (not shown). The body 2 has a tapered bore 4 which, adjacent its small end, is intersected by the diametrically extending drive pin 5.

Screwed into the end of the chuck body 2 is a nosepiece assembly 6 which cooperates with the collet assembly 7 to urge the latter axially inward against the tapered bore 4 to contract it upon the shank 8 of a tool T such as an end mill. Such axial inward force is applied on the collet assembly 7 through the beveled nose ring 9 engaged around the outer beveled end of the collet assembly 7 through an antifriction thrust bearing 10 interposed between said nose ring 9 and the inturned flange 11 of the nosepiece 12. Because the taper of the collet assembly 7 and the bore 4 is preferably self-locking to achieve firm gripping of the tool shank 8, the nosepiece assembly 6 is additionally provided with a ring 14 which is held in the nosepiece 12 by a split retainer 15, and which is adapted to bear on the shoulder 16 of the collet assembly to positively withdraw the collet assembly 7 from the body 2 when the nosepiece 12 is loosened.

The collet 17 is alternately slotted through its opposite ends as best shown at the left in FIG. 2, and thus will be radially contracted when urged axially inward of the chuck body 2 by turning of the nosepiece 12. The axially inner end of the collet 17 is internally threaded for axial adjustment therein of the tool drive and gripping sleeve 18 which receives the tool shank 8 therein and which is slotted at its axially inner end to fit over the drive pin 5.

Commercially available end mills and like tools T, are provided with a flat 19 on the shank 8 thereof generally of the form shown in FIG. 1. In the present chuck 1 the drive sleeve 18 has a radial opening 20 in which is disposed a locking pin 21 having a flat inner end with beveled edges of which the edge 23 constitutes a cam surface when engaged by the end of the tool shank 8 when the latter is axially inserted, and of which the edge 24 is adapted to engage the shoulder 25 of the tool shank to prevent axial withdrawal of the tool T. The pin 21 is held in place by the split ring 26 which permits such radial outward movement of the pin during insertion of the tool shank 8, the edges of the groove 27 on the pin being peened over the portion of the snap ring 26 to hold the pin 21 against dropping radially inward through the opening 20 when the tool shank 8 is removed.

In the present case, the drive sleeve 18 has a stop screw 28 adjustably threaded therein so as to engage the end of the tool shank when the beveled edge 24 of the pin 21 is engaged with the shoulder 25, and thus the tool T cannot slip axially inwardly with respect to the collet assembly 7.

With the stop screw 28 properly adjusted, it is a simple matter merely to axially insert the tool shank 8 into the drive sleeve 18 until the shank end abuts the stop screw 28 and then to relatively turn the drive sleeve 18 and tool T until the locking pin 21 registers with the flat 19, at which time, the pin 21 will spring into a position where its outer end is even with the outer surface of the drive sleeve 18.

The drive sleeve 18 with the tool shank 8 therein can then be screwed into the collet 17 to axially position the cutting end of the tool T with respect to the collet 17. Finally, the entire assembly is inserted into the chuck body 2 with the slotted end of the drive sleeve 18 positioned over the driving pin 5 and then, upon tightening of the nosepiece 12, the collet 17 will be tightly wedged in the tapered bore 4 and thereby contracted radially around the axially slotted end of the drive sleeve 18 and, in turn, the latter will be tightly contracted onto the shank 8 of the tool T. As evident, the tool T is held by the locking pin 21 against turning and the engagement of the beveled faces 24 and 25 prevents axial withdrawal of the tool T in use. Furthermore, the stop screw 28 prevents axial inward slipping of the tool with respect to the collet assembly 7.

The chuck 30 illustrated in FIGS. 4 and 5 again comprises a chuck body 31 having a tapered bore 32 with which the collet 34 cooperates for contraction into gripping engagement with a tool shank 35 through axial force applied on the outer end of the collet 34 by means of a nosepiece assembly, including a nosepiece 36 having threaded engagement with the chuck body 31, and a thrust bearing 37 interposed between the nose ring 38 and the nosepiece flange 39. Thus, when the nosepiece 36 is tightened, the nose ring 38 bears on the outer end of the collect and urges it axially inwardly against the tapered bore 32 to thus effect contraction of the collet 34 into firm gripping engagement with the tool shank 35. Because it is preferred to have self-locking wedge taper engagement between the collet 34 and chuck body 31, there is provided in the nosepiece assembly a collet withdrawing ring 40 which bears against the shoulder 41 to positively withdraw the collet 34 from the chuck body 31 upon loosening of the nosepiece 36.

The collet 34 herein shown by way of example, comprises three segments 44 with coil springs 42 therebetween and with split rings 43 adjacent the ends of the segments 44 holding them together.

In FIGS. 4 and 5 the locking pin 45 is disposed in an opening 46 defined between two adjacent segments 44 and is retained by a split spring ring 47 in the same manner as shown in FIGS. 1 to 3. In the FIG. 4 embodiment, a stop screw 48 is threaded directly in the chuck body 31 and preferably is adjusted so as to have a slight clearance with the end of the tool shank 35 when the tool and collet assembly is inserted in the chuck body 31. Such slight clearance permits axial inward movement of the collet 34 in the chuck body 31 as necessary for effecting contraction of the collet 34 into tight gripping engagement with the tool shank 35.

With the nosepiece and collet assembly detached from the chuck body 31, the tool shank 35 is simply axially pushed into the collet 34, the pin 45 being radially sprung outwardly by engagement of the end of the tool shank 35 with the beveled cam surface 49 and when the tool shank 35 and collet 34 are relatively turned, the locking pin 45 will spring radially inward to the position shown in FIG. 4 when the flat 50 of shank 35 is in register with the inner end of said pin. The nosepiece and collet assembly are then inserted and secured to the chuck body 31 and, upon tightening of the nosepiece 36, the collet 34 will be urged axially inwardly and thereby wedged in the tapered bore 32 and contracted into firm gripping engagement with the tool shank 35. The tool cannot be axially withdrawn by reason of the engagement of the shoulder 51 with the correspondingly beveled surface 52, the pin 45 being prevented from moving radially outward by the surrounding tapered bore 32 of the chuck body 31.

Other modes of applying the principle of the invention may be employed, change being made as regards the details described, provided the features stated in any of the following claims, or the equivalent of such, be employed.

I therefore particularly point out and distinctly claim as my invention:

1. A chuck comprising a body; a collet arranged to be radially contracted when axially moved in said body; a nosepiece on said body for so axially moving said collet; and a radially disposed locking pin in said collet having an inner end adapted to radially overlap a shoulder on the shank of a tool to prevent axial withdrawal of the tool from said collet, said locking pin having a beveled edge through which said pin is cammed radially outward upon axial insertion of a tool shank into said collet.

2. A chuck comprising a body; a collet arranged to be radially contracted when axially moved in said body; a nosepiece on said body for so axially moving said collet; and a radially disposed locking pin in said collet having an inner end adapted to radially overlap a shoulder on the shank of a tool to prevent axial withdrawal of the tool from said collect, the radially inner end of said locking pin being beveled for engagement with the correspondingly beveled shoulder of said tool shank.

3. A chuck comprising a body; a collet arranged to be radially contracted when axially moved in said body; drive means interengaging said body with said collet to preclude relative rotation therebetween; a nosepiece on said body for so axially moving said collet; and a radially disposed locking pin in said collet having an inner end adapted to radially overlap a shoulder on the shank of a tool to prevent axial withdrawal of the tool from said collet.

4. A chuck comprising a body; a collet arranged to be radially contracted when axially moved in said body; a nosepiece on said body for so axially moving said collet; and a radially disposed locking pin in said collet having an inner end adapted to radially overlap a shoulder on the shank of a tool to prevent axial withdrawal of the tool from said collet; said collet comprising outer and inner collet means connected together for relative axial adjustment.

5. The chuck of claim 4 wherein said inner collet means carries said locking pin, said locking pin being held against radial outward movement by said outer collet means.

6. The chuck of claim 4 wherein said inner collet means has a positive driving connection with said body.

7. The chuck of claim 4 wherein said inner collet means has an adjustable stop screw therein adapted to be abutted by the end of said tool shank when the latter is inserted in said inner collet means.

8. A chuck comprising a body; a collet arranged to be radially contracted when axially moved in said body; a nosepiece on said body for so axially moving said collet; and a radially disposed locking pin in said collet having an inner end adapted to radially overlap a shoulder on the shank of a tool to prevent axial withdrawal of the tool from said collet and to engage a flat on said shank adjacent said shoulder to prevent relative rotation of said collet and tool; said locking pin having a beveled edge through which said pin is cammed radially outward upon axial insertion of the tool shank thereinto, and wherein spring means bearing on said locking pin urges the latter radially inwardly when registered with the shoulder and flat on said tool shank.

9. The chuck of claim 3 wherein said drive means comprises a drive pin fixedly secured to said body and extending through a slot in the inner end of said collet.

10. The chuck of claim 1 wherein said locking pin is provided with a groove in which there is disposed a spring means for permitting radial outward movement of said pin during axial insertion of said tool shank, the edges of said groove being peened over said spring means to hold said locking pin in position in said collet when said collet is removed.

11. The chuck of claim 2 further including stop means in said chuck operative to engage the end of said tool shank when the beveled end of said pin is engaged with the beveled shoulder of said tool shank, thereby precluding both axial inward and axial outward movement of said tool shank.

12. The chuck of claim 1 wherein said collet comprises three segments between which there are disposed coil springs, and split rings adjacent the ends of said segments adapted to hold said segments together.

References Cited by the Examiner

UNITED STATES PATENTS

| | | | |
|---|---|---|---|
| 2,896,956 | 7/59 | Ann | 279—46 |
| 3,035,845 | 5/62 | Benjamin | 279—47 |
| 3,052,999 | 9/62 | Sedgwick. | |

FOREIGN PATENTS 908,319  9/45  France.

ROBERT C. RIORDON, *Primary Examiner.*